United States Patent
Seo et al.

(10) Patent No.: US 11,917,233 B2
(45) Date of Patent: Feb. 27, 2024

(54) DISPLAY DEVICE AND A REMOTE CONTROLLER CONTROLLING SAME

(71) Applicant: LG ELECTRONICS INC., Seoul (KR)

(72) Inventors: Kwan Hee Seo, Seoul (KR); Obong An, Seoul (KR); Mi Yeon Kwon, Seoul (KR); Kyung Ryun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/791,375

(22) PCT Filed: Jan. 7, 2020

(86) PCT No.: PCT/KR2020/000272
§ 371 (c)(1),
(2) Date: Jul. 7, 2022

(87) PCT Pub. No.: WO2021/141152
PCT Pub. Date: Jul. 15, 2021

(65) Prior Publication Data
US 2023/0041881 A1    Feb. 9, 2023

(51) Int. Cl.
*H04N 21/422*    (2011.01)

(52) U.S. Cl.
CPC . *H04N 21/42215* (2013.01); *H04N 21/42221* (2013.01)

(58) Field of Classification Search
USPC ........................................................ 348/734
See application file for complete search history.

(56) References Cited

U.S. PATENT DOCUMENTS

| 7,711,874 B1 | 5/2010 | Ilyasov et al. |
| 8,063,884 B2 | 11/2011 | Kondo et al. |
| 8,413,057 B2 | 4/2013 | Choi et al. |
| 8,619,147 B2 * | 12/2013 | King ................. G06F 40/143 |
| | | 348/210.99 |
| 9,407,949 B2 | 8/2016 | Kim |
| 9,595,186 B2 | 3/2017 | Kim |
| 10,503,389 B2 | 12/2019 | Kim |

(Continued)

FOREIGN PATENT DOCUMENTS

| CN | 101193194 A | 6/2008 |
| CN | 101645198 B | 9/2011 |

(Continued)

*Primary Examiner* — John W Miller
*Assistant Examiner* — Sean N. Haiem
(74) *Attorney, Agent, or Firm* — Birch, Stewart, Kolasch & Birch, LLP

(57) ABSTRACT

Disclosed are a display device and a remote controller controlling same. The display device comprises a communication unit for receiving a request packet periodically transmitted from the remote controller including a plurality of buttons, wherein the request packet includes an event associated with a first button among the plurality of buttons; an identification unit for periodically identifying whether the request packet is received within a first time section; and a control unit for, when periodic reception of the request packet is stopped within the first time section, controlling the operation of the display device to forcibly perform a release event of the first button.

7 Claims, 11 Drawing Sheets

(56) References Cited

U.S. PATENT DOCUMENTS

| | | | |
|---|---|---|---|
| 2001/0011955 A1 | 8/2001 | Fujii | |
| 2004/0218899 A1* | 11/2004 | Oyama | H04N 21/6375 348/E7.071 |
| 2008/0192003 A1* | 8/2008 | Kondo | G06F 3/0231 345/156 |
| 2009/0239587 A1 | 9/2009 | Negron et al. | |
| 2011/0072358 A1* | 3/2011 | Choi | G08C 19/28 715/740 |
| 2011/0167370 A1* | 7/2011 | Kim | G06F 3/04817 345/173 |
| 2012/0069131 A1* | 3/2012 | Abelow | G06Q 30/0601 345/589 |
| 2012/0326850 A1* | 12/2012 | Kim | G08C 23/04 340/12.22 |
| 2013/0194081 A1 | 8/2013 | Choi et al. | |
| 2015/0208013 A1 | 7/2015 | Friedrich | |
| 2015/0382043 A1* | 12/2015 | Moon | H04N 21/64322 725/133 |
| 2017/0147178 A1 | 5/2017 | Kim | |
| 2019/0327701 A1* | 10/2019 | Akiba | H04W 76/30 |
| 2020/0081599 A1 | 3/2020 | Kim | |
| 2020/0244296 A1* | 7/2020 | Gilson | G08C 23/04 |

FOREIGN PATENT DOCUMENTS

| | | |
|---|---|---|
| CN | 107040806 A | 8/2017 |
| JP | 2002-55764 A | 2/2002 |
| KR | 10-0770415 B1 | 10/2007 |
| KR | 10-2011-0073392 A | 6/2011 |
| KR | 10-2013-0000652 A | 1/2013 |
| KR | 10-1748735 B1 | 6/2017 |
| WO | WO 2006/098306 A1 | 9/2006 |

\* cited by examiner

[FIG. 1]
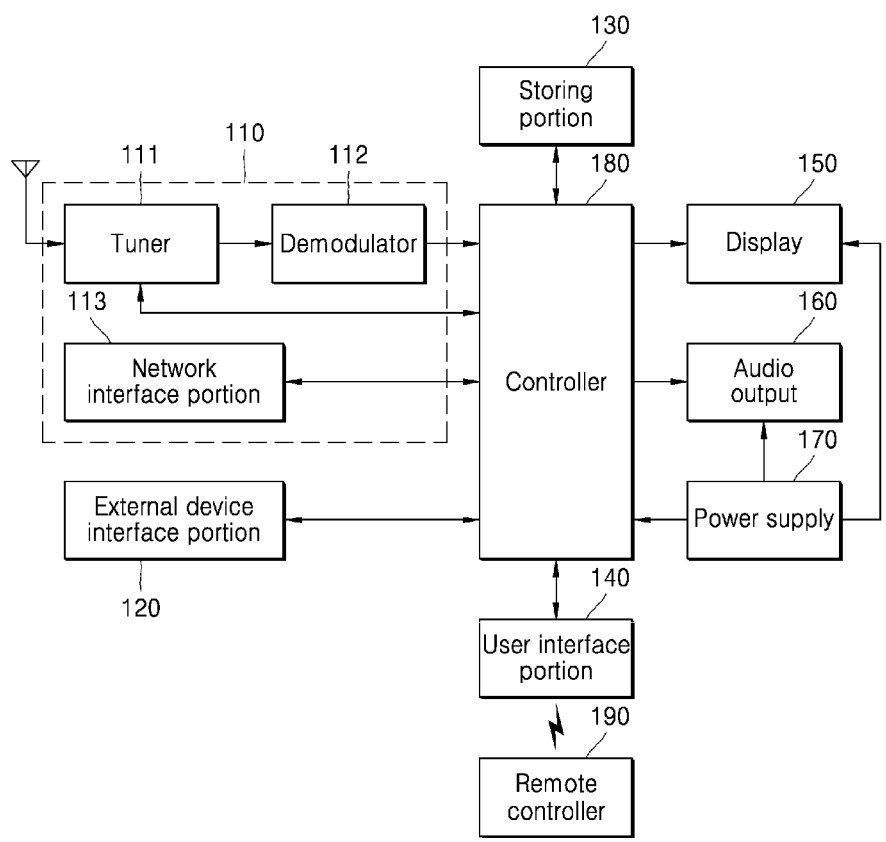

[FIG. 2]
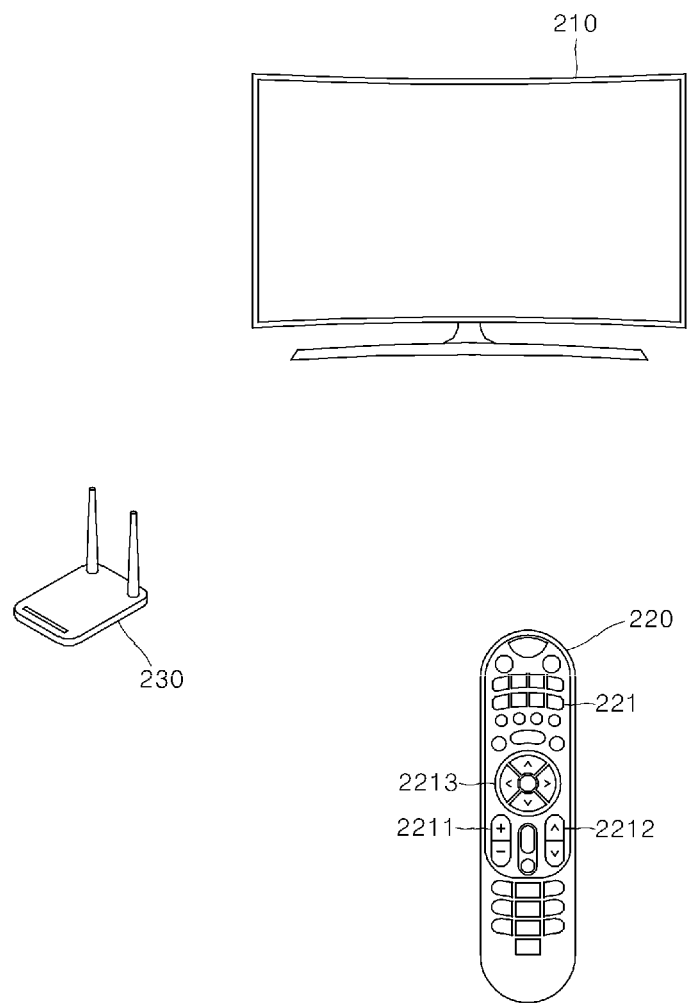

[FIG. 3]
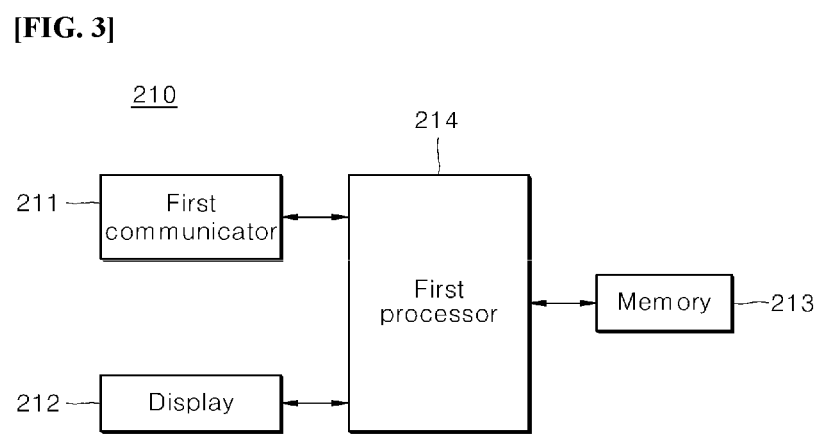

[FIG. 4]
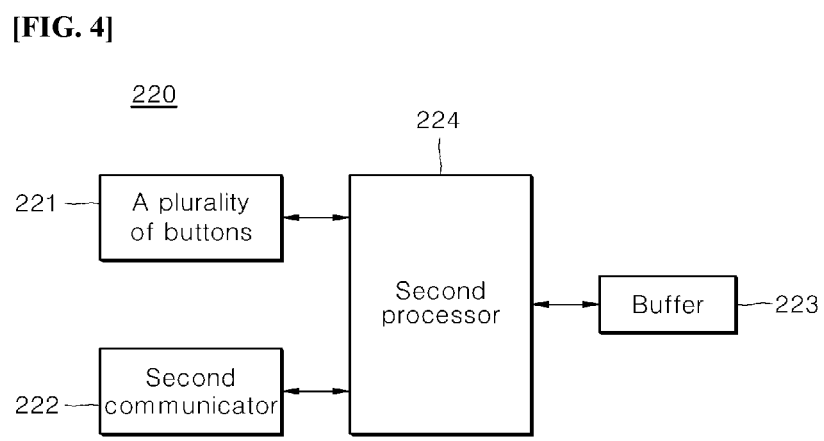

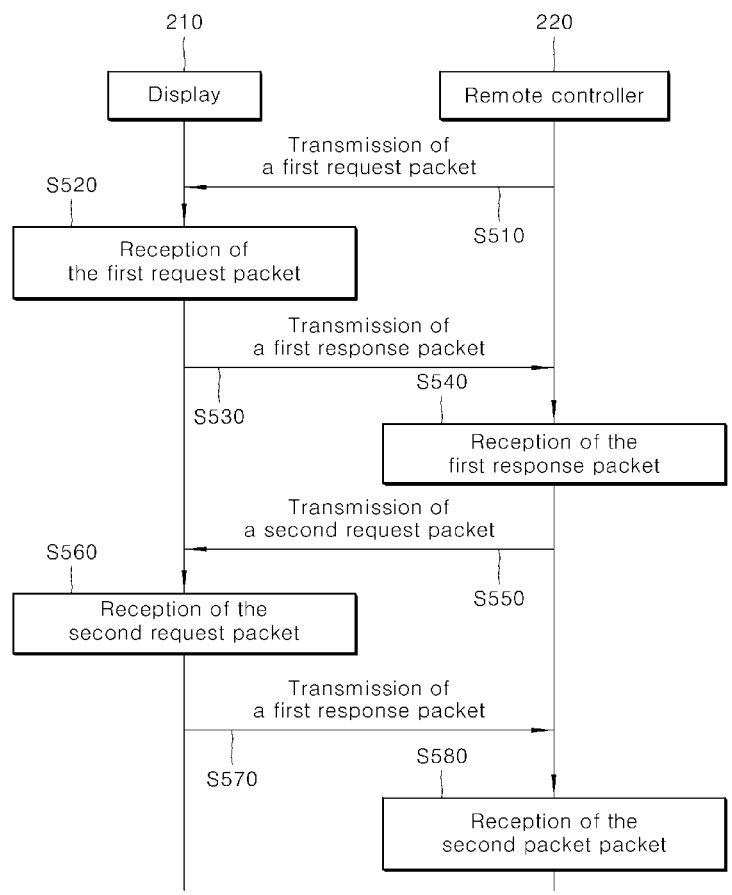

[FIG. 6]
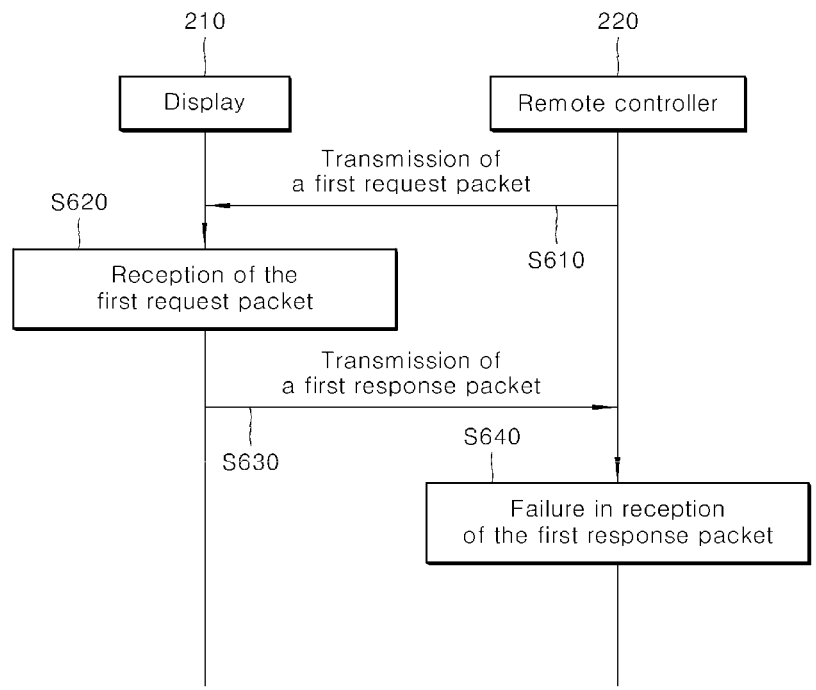

[FIG. 7]
223
| Key(P) | Key(P) | Key(P) | Key(P) | Key(P) | Key(P) | Key(P) | Key(P) | Key(P) | Key(P) |
223
| Empty | Empty | Empty | Empty | Empty | Empty | Empty | Empty | Empty | Empty |

[FIG. 8]
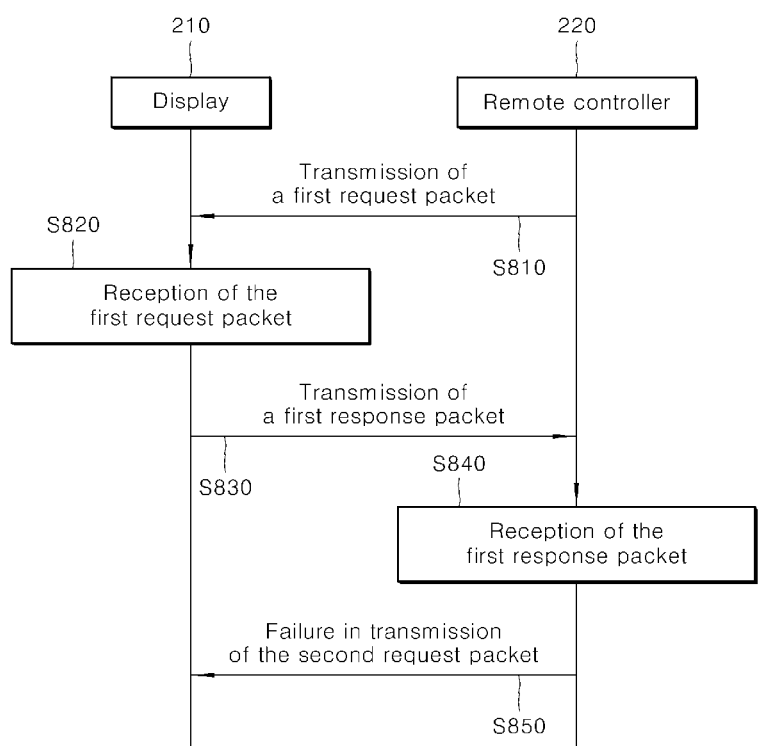

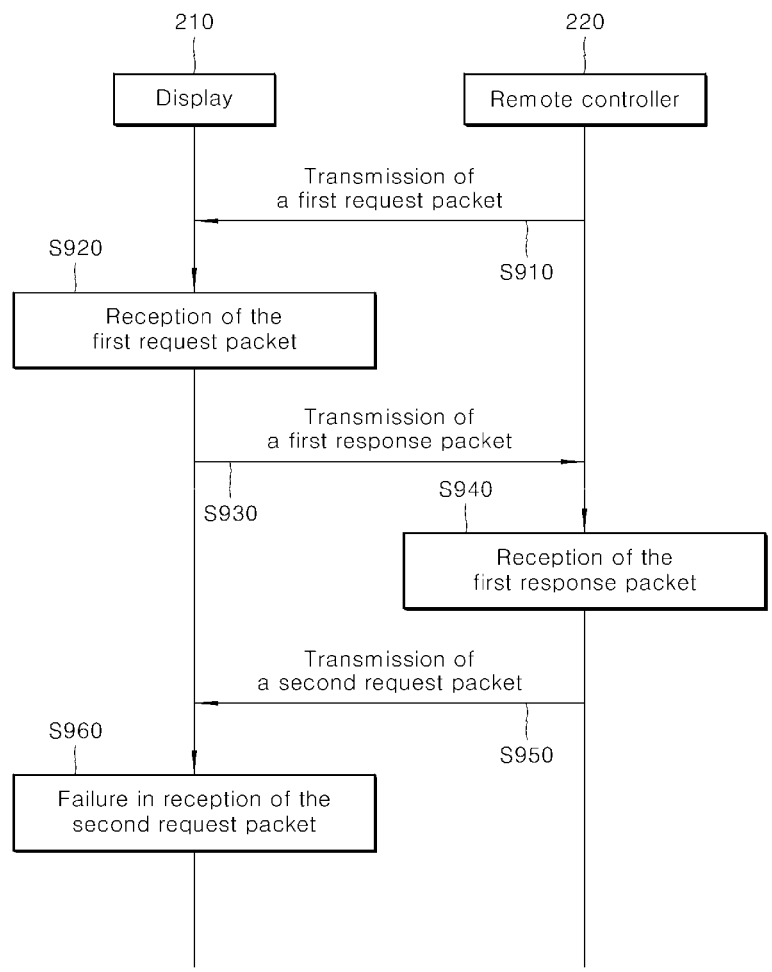
[FIG. 9]

[FIG. 10]
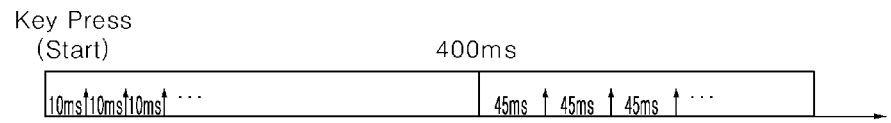

[FIG. 11]
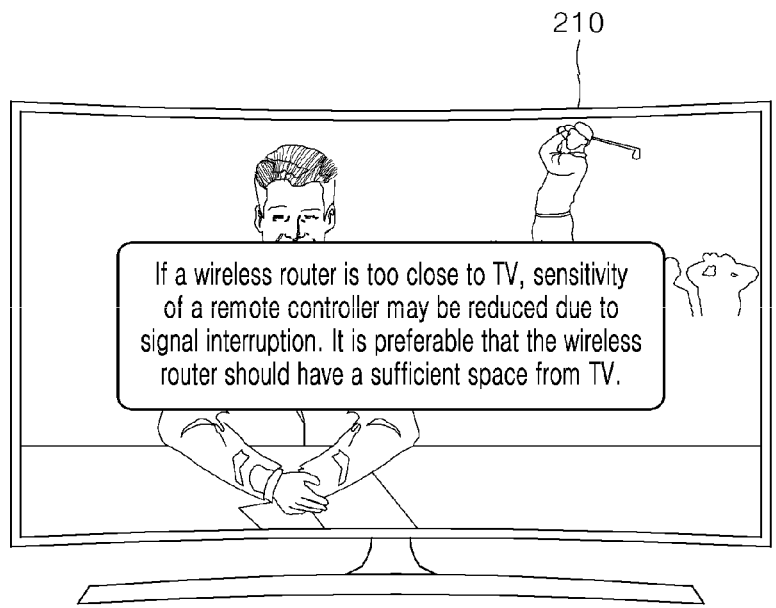

DISPLAY DEVICE AND A REMOTE CONTROLLER CONTROLLING SAME

CROSS REFERENCE TO RELATED APPLICATIONS

This application is the National Phase of PCT International Application No. PCT/KR2020/000272, filed on Jan. 7, 2020, all of which is hereby expressly incorporated by reference into the present application.

TECHNICAL FIELD

The present disclosure relates to a display device which may prevent a state where successive input of a button occurs regardless of a motion of a user and a remote controller for controlling the same.

BACKGROUND ART

A display device is a device having a function for providing a video which may be watched by a user. The user may watch a broadcast through the display device. The display device provides a broadcast selected by a user among broadcast signals transmitted by a broadcast station, and this broadcasting video is displayed on a display. A TV is one representative example of the display device.

An operation of the display device is controlled by a remote controller. The remote controller is configured to generally control the display device using infrared signals, and in recent years, control the display device by using a wireless signal of a frequency bandwidth for a short-range wireless communication, for example, a wireless signal of a Bluetooth frequency bandwidth (2.4 GHZ).

Meanwhile, electric and electronic appliances (e.g., a router) performing communication using a wireless signal of a frequency bandwidth (i.e., a first frequency bandwidth) identical to that of the remote controller. In this case, an error in the operation of the remote controller due to use of the first frequency bandwidth of the electric and electronic device may occur.

That is, a state where even though a user presses a certain button once, the certain button is successively pressed in the display device may occur. This results in the user's inconvenience.

DESCRIPTION OF INVENTION

Technical Problems

The present disclosure is for providing a display device which may prevent a state where successive input of the button occurs regardless of a motion of the user and a remote controller for controlling the same.

Also, the present disclosure is for preventing a malfunction of the remote controller and thus, being capable of resolving the user's inconvenience in use of the remote controller.

Objectives of the present disclosure are not limited to the noted objectives above. The other objectives and advantages of the present disclosure which are not noted may be understood by the description below and may be more clearly understood by embodiments of the present disclosure. Also, it may be easily understood that objectives and advantages of the present disclosure may be realized by means represented in the scope of patent claims and combinations thereof.

Technical Solutions

The display device according to an example of the present disclosure includes a communicator configured to receive a request packet periodically transmitted from a remote controller with a plurality of buttons, wherein the request packet includes an event associated with a first button among the plurality of buttons, an identifier configured to periodically identify whether the request packet is received within a first time period; and a controller configured to, when periodic reception of the request packet is stopped within the first time period, control an operation of the display device to forcibly perform a release event of the first button.

The display device according to another example of the present disclosure includes a communicator configured to transceive a packet with a remote controller with a plurality of buttons; and a controller configured to control an operation of the display device such that in a state where a first request packet including a press event of a first button among the plurality of buttons is received from the remote controller, if a second request packet including a release event of the first button is not received within a predetermined time period, the release event of the first button is performed.

A remote controller according to an example of the present disclosure includes a plurality of buttons; and a buffer including a plurality of buffer cells and storing a press event or a release event of each of the plurality of buttons; a communicator configured to transmit a request packet including the press event or the release event to a display device, and receive a response packet with respect to the request packet from the display device; a controller configured to control an operation of the buffer and the communicator and generate the request packet, wherein the controller is configured to, when all of press events of the first button among the plurality of buttons are stored in the plurality of buffer cells, delete all of the press events of the first button stored in the buffer.

Advantageous Effects

According to the present disclosure, it may be prevented that a state where successive input of a button of a remote controller occurs regardless of a motion of a user.

Also, according to the present disclosure, a malfunction of the remote controller is prevented, and thus the user's inconvenience in use of the remote controller may be resolved.

In addition to the above effects, specific effects of the present disclosure are described with describing specific matters for performing the invention hereinafter.

BRIEF DESCRIPTION OF DRAWINGS

FIG. 1 is a view showing a schematical configuration of a digital device according to an example of the present disclosure.

FIG. 2 is a view showing a schematical configuration of a network system according to an example of the present disclosure.

FIG. 3 is a view showing a schematical configuration of a display device according to an example of the present disclosure.

FIG. 4 is a view showing a schematical configuration of a remote controller according to an example of the present disclosure.

FIG. 5 is a view showing a flow chart of a state where a display device normally operates.

FIGS. 6 to 9 are views showing a flow chart of a state where a display device abnormally operates.

FIG. 10 is a view for describing a concept of an operation for identifying a request packet of a display device.

FIG. 11 is a view showing an operation of a display device for displaying a guidance message which induces movement of a position of an electric and electronic appliance according to one example of the present disclosure.

DETAILED DESCRIPTION OF EXEMPLARY EMBODIMENTS

The foregoing objectives, features, and advantages are specifically described hereinafter with reference to the attached drawings. Accordingly, those skilled in the art to which the present disclosure pertains may easily perform the technical spirit of the present disclosure. In describing the present disclosure, the detailed description is omitted if it is determined that the detailed description about the known art related to the present disclosure makes the gist of the present disclosure vague. Hereinafter, preferable embodiments are specifically described with reference to the attached drawings. Throughout the drawings, identical reference numerals denote identical or similar components.

Even though the terms such as "first" and "second" are used for describing various components, the components should not be limited by the terms. The terms are merely used in order to distinguish one component from another component. It is natural that if there is no particular description opposite to the above, a first component may be a second component.

Also, when a certain component is described as being "connected," "coupled" or "linked" to another component, it is to be understood that the component may be directly connected or be linked to another component, but an additional component may be "interposed" between the two components, or the two components may be "connected," "coupled" or "linked" through an additional component.

In a whole of specification, each component may be singular or plural as long as there is no description particularly opposite to the above.

A singular expression used in this specification includes a plural expression as long as the expression is not definitely differently indicated in the context. In the present specification, the term "configure" or "include" etc. should not be construed to necessarily include all of various components or various steps described in specification. It should be construed such that some components or some steps of the above may not be included, or additional components or steps may be further included.

In the whole of specification, when the term "A and/or B" is used, the term means A, B or A and B as long as there is no description particularly opposite to the above. When the term "C to D" is used, the term means C or more and D or less as long as there is no description particularly opposite to the above.

Meanwhile, the display device described in the present specification is, for examples, an intelligent display device in which a function of supporting a computer is added to a function of receiving a broadcast. While the function of receiving the broadcast is faithfully performed, an internet function and the like are added. A more convenient interface in use than a handwriting input device, a touch screen, a space remote controller, or the like may be obtained. Further, thanks to a wired or wireless internet function support, it is possible to be connected to an internet and a computer, and perform a function such as an email, web browsing, banking, or a game. For these various functions, standardized general-purpose OS may be used.

Therefore, the display device described in the present specification may perform various user-friendly functions because, for example, various applications on a general-purpose OS kernel may be freely added or deleted. More specifically, the display device may be, for example, a network display device, a HBB display device, a smart display device, a LED display device, an OLED display device, and the like. In some cases, the display device may be also applied to a mobile terminal.

The mobile terminal described in the present specification may include a cellular phone, a smart phone, a laptop computer, a terminal for a digital broadcast, personal digital assistants (PDA), a portable multimedia player (PMP), navigation, slate PC, tablet PC, an ultrabook, a wearable device, for example, a watch-shaped terminal such as a smartwatch, a glasses-shaped terminal such as smart glasses, a head mounted display (HMD), and the like.

However, those skilled in the art may easily understand that a configuration according to an example described in the present specification may be applied to a fixed terminal such as a digital display device, a desktop computer, and digital signage except for a case that it is may be applied to only a mobile terminal.

Hereinafter, a display device and a method for controlling the same according to some examples of the present disclosure are described.

FIG. 1 is a view showing a schematical configuration of a digital device according to an example of the present disclosure.

Referring to FIG. 1, a digital device 100 may include a broadcast receiving portion 110, an external device interface portion 120, a storing portion 130, a user interface portion 140, a display 150, an audio output 160, a power supply 170, and a controller 180.

Here, a broadcast receiving portion 110 may include a tuner 111, a demodulator 112, and a network interface portion 113. Meanwhile, in some cases, the broadcast receiving portion 110 may include the tuner 111 and the demodulator 112, but may not include the network interface portion 113, and vice versa.

Also, the broadcast receiving portion 110 may include a multiplexer not shown. In this case, the multiplexer may multiplex a signal demodulated in the demodulator 112 and a signal received through the network interface portion 113. In addition, the broadcast receiving portion 110 may also include a demultiplexer not shown. The demultiplexer may demultiplex a multiplexed signal or may demultiplex a signal demodulated in the demodulator 112 and a signal received through the network interface portion 113.

The tuner 111 is configured to tune a specific Radio Frequency (RF) broadcast signal. The specific RF broadcast signal corresponds to a channel selected by a user or all of the existing stored channels. Also, the tuner 111 transforms a RF broadcast signal to an Intermediate Frequency (IF) signal or a baseband signal.

For example, the tuner 111 transforms a RF broadcast signal which is a digital broadcast signal to a digital IF signal (DIF), and transforms a RF broadcast signal which is an analog broadcast signal to an analog baseband video or a voice signal (CVBS/SIF). That is, the tuner 111 may process all of digital broadcast signals or analog broadcast signals.

The analog baseband video or the voice signal (CVBS/SIF) output from the tuner 111 may be directly input to the controller 180.

Also, the tuner 111 may receive a RF broadcast signal of a single carrier or a multiple carrier. Meanwhile, the tuner 111 may sequentially tune and receive a RF broadcast signal of all broadcast channels stored by a channel memory function, and may transform the same to an intermediate frequency signal or a baseband signal.

The demodulator 112 may receive and demodulate a digital IF signal transformed in the tuner 111, and may perform channel decoding and the like. For the above, the demodulator 112 may include a Trellis Decoder, a De-interleaver, a Reed-Solomon Decoder, and the like, or may include a convolution decoder, a deinterleaver, a Reed-Solomon decoder, and the like.

The demodulator 112 may output a stream signal (TS) after performing demodulation and channel decoding. Here, the stream signal may be a signal in which a video signal, a voice signal, or a data signal is multiplexed. As an example, the stream signal may be MPEG-2 Transport Stream (TS) in which a MPEG-2 standard video signal, a Dolby AC-3 standard voice signal, and the like are multiplexed.

The stream signal output from the demodulator 112 may be input to the controller 180. The controller 180 may control demultiplexing, video/voice signal processing, and the like, and may control the video via the display 150 and may control output of the voice via the audio output 160.

The external device interface portion 120 may provide an interfacing environment between the digital device 100 and various external devices.

The external device interface portion 120 may be wiredly/wirelessly connected to the external device such as a Digital Versatile Disk (DVD), Blu-ray, a game device, a camera, a Camcorder, a computer (notebook), a tablet PC, a smart phone, a Bluetooth device, and Cloud. The external device interface portion 120 is configured to transfer a signal including data such as an image, a video, and a voice input by the connected external device, to the controller 180. The controller 180 may control to output a data signal such as the processed image, video, and voice to the connected external device. For the above, the external device interface portion 120 may further include an A/V input/output (not shown) or a wireless communicator (not shown).

In order to be capable of inputting a video signal and a voice signal of the external device to the digital device 100, the A/V input/output may include a USB terminal, a Composite Video Banking Sync (CVBS) terminal, a component terminal, a S-video terminal (analog), a Digital Visual Interface (DVI) terminal, a High Definition Multimedia Interface (HDMI) terminal, a RGB terminal, a D-SUB terminal, and the like.

The wireless communicator may perform a short-range wireless communication with other digital devices. The digital device 100 may have network connection with other digital devices according to a communication protocol, for example, Bluetooth, Radio Frequency Identification (RFID), Infrared Data Association (IrDA), Ultra Wideband (UWB), ZigBee, Digital Living Network Alliance (DLNA), and the like.

Also, the external device interface portion 120 may be connected via at least one of a set top box (STB) and the foregoing various terminals, and may perform input/output operations with the set top box (STB).

Meanwhile, the external device interface portion 120 may receive an application or an application list within the adjacent external device and may transfer the same to the controller 180 or the storing portion 130.

The network interface portion 113 is configured to prove an interface for connecting the digital device 100 to the wired/wireless network. The network interface portion 113 may have an Ethernet terminal for connection with the wired network. For connection with the wireless network, a communication specification such as Wireless LAN (WLAN), Wi-Fi, Wireless broadband (Wibro), World Interoperability for Microwave Access (Wimax), and High Speed Downlink Packet Access (HSDPA) may be used.

The network interface portion 113 may transceive data with other digital devices through the connected network or the other networks linked to the connected network. In particular, partial content data stored in the digital device 100 may be transmitted to the digital device selected among other digital devices registered in advance.

Meanwhile, the network interface portion 113 may be connected to a certain web page through the connected network or the other networks linked to the connected network. That is, it is possible to connect to a certain web page through the network and transmit or receive data to or from the relevant server. Besides, contents or data provided by a content provider or a network manager may be received. That is, contents such as a movie, an advertisement, a game, VOD, and a broadcast signal, and information thereof which are provided by the content provider or the network provider may be received via the network. Also, update information and update files of firmware provided by the network manager may be received. Also, data may be transmitted to an internet or content provider or a network manager.

The network interface portion 113 may select and receive a desired application among applications opened through the network.

The storing portion 130 may store a program for processing and controlling each signal within the controller 180 and may store a video, voice, or data signal which is signal-processed.

The storing portion 130 may temporarily store a video, voice, or data signal input from the external device interface portion 120 or the network interface portion 113. The storing portion 130 may store information related to a certain broadcast channel through a channel memory function.

The storing portion 130 may store an application or an application list input from the external device interface portion 120 or the network interface portion 330.

The storing portion 130 may store various platforms which are described hereinafter.

The storing portion 130 may include at least one type of storing media, for example, a flash memory type, a hard disk type, a multimedia card micro type, a card-type memory (e.g., a SD or XD memory, etc.), RAM, ROM (e.g., EEPROM, etc.). The digital device 100 may play content files (a moving image file, a static image file, a music file, a document file, an application file, and the like) stored in the storing portion 130 and may provide the same for a user.

Meanwhile, the storing portion 130 may be included in the controller 180, and may be included to be separated from the controller 180.

The user input interface portion 140 transmits a signal input by the user to the controller 180 or transmits a signal of the controller 180 to the user.

For example, the user input interface portion 140 may be connected to a remote control device 190 according to various communication methods such as a RF communication method, and an IR communication method, and may receive and process a control signal such as power on/off, channel selection, and screen configuration transmitted from the remote control device 190 or may transmit a control signal of the controller 180 to a remote control device 500. Also, the user input interface portion 140 may transmit a control signal input from a local key (not shown) such as a power key, a channel key, a volume key, and a set point to the controller 180.

The user input interface portion 140 may transmit a control signal input from a sensing portion (not shown) sensing a gesture of a user to the controller 180 or may transmit a signal of the controller 180 to a sensing portion (not shown). Here, the sensing portion (not shown) may include a touch sensor, a voice sensor, a position sensor, a motion sensor, and the like.

The controller 180 may demultiplex a stream input through the tuner 111, the demodulator 112, or the external device interface portion 120, or may process demultiplexed signals to generate and output signals for outputting a video or voice.

The video signal processed by the controller 180 may be input to the display 150 and may be displayed as a video corresponding to the relevant video signal. Also, the video signal video-processed by the controller 180 may be input to an external output device through the external device interface portion 120.

A voice signal processed by the controller 180 may be audio-output to an audio output 160. Also, the voice signal processed by the controller 180 may be input to an external output device through the external device interface portion 120.

Meanwhile, the controller 180 may include a demultiplexer, a video processor, and the like.

The controller 180 may control overall operations of the digital device 100. For example, the controller 180 may control the tuner 111 to tune a RF broadcast corresponding to the channel selected by the user or the existing stored channel.

The controller 180 may control the digital device 100 by user instructions input through the user input interface portion 140 or internal programs. In particular, the user may connect to the network and download a desired application or application list into the digital device 100.

For example, the controller 180 is configured to control the tuner 111 such that a signal of the channel selected according to a certain channel selection instruction received through the user input interface portion 140 is input. Further, the video, voice, or data signal of the selected channel is processed. The controller 180 is configured to control such that channel information and the like selected by the user may be output together with the processed video or voice signal through the display 150 or the audio output 160.

As another example, the controller 180 is configured to control such that the video signal or voice signal from the external device may be output through the display 150 or the audio output 160 according to an external device video play instruction received through the user input interface portion 140.

Meanwhile, the controller 180 may control the display 150 to display the video. For example, the control may be performed such that a broadcast video input through the tuner 111 or an external input video input through the external device interface portion 120 or a video input through the network interface portion or a video stored in the storing portion 130 are displayed on the display 150. Here, the video displayed on the display 150 may be a static image or a moving image, and may be a 2D image or a 3D image.

Also, the controller 180 may control the display 150 to play the content. Here, the content may be the content stored in the digital device 100 or the received broadcast content or the external input content input from an outside. The content may be at least one of a broadcast image, an external input image, an audio file, a static image, a connected web screen, and a document file.

Meanwhile, the controller 180 when entering into an application view item, may control to display a downloadable application or application list in the digital device 100 or from the external network.

The controller 180 may control to install and drive an application downloaded from the external network, together with various user interfaces. Also, the controller 180 may control to display an image related to an application executed by selection of the user on the display 150.

Meanwhile, it is possible to further include a channel browsing processor not shown in the drawings but configured to generate a thumbnail image corresponding to a channel signal or an external input signal.

The channel browsing processor is configured to receive input of a stream signal (TS) output from a demodulator 320, a stream signal output from the external device interface portion 120, or the like, extract an image from the input stream signal, and generate the thumbnail image. The generated thumbnail image may be input to the controller 180 as it is or by encoding. Also, it is possible that the generated thumbnail image is encoded in a stream form and is input to the controller 180. The controller 180 is configured to be capable of displaying a thumbnail list containing a plurality of thumbnail images on the display 150 by using the input thumbnail image. Meanwhile, thumbnail images within this thumbnail list may be updated sequentially or simultaneously. Accordingly, the user may simply understand contents of a plurality of broadcast channels.

The display 150 is configured to convert an image signal processed by the controller 180, a data signal, an OSD signal or an image signal received from the external device interface portion 120, a data signal, and the like to R, G, and B signals respectively and generate a driving signal.

The display 150 may be a PDP display, a LCD display, an OLED display, a flexible display, a 3D display, and the like.

Meanwhile, it is possible that the display 150 is configured as a touch screen and is used as an input device besides an output device.

The audio output 160 is configured to receive of input of a signal voice-processed by the controller 180, for example, a stereo signal, a 3.1 channel signal or a 5.1 channel signal and output the same as a voice. The voice output 160 may be configured as a speaker in various forms.

Meanwhile, in order to sense a gesture of the user, the sensing portion (not shown) having at least one of the touch sensor, the voice sensor, the position sensor, and the motion sensor as described above may be further included in the digital device 100. The signal sensed by the sensing portion (not shown) may be transmitted to the controller 3180 through the user input interface portion 140.

Meanwhile, a photographing portion (not shown) configured to photograph the user may be further included. Image information photographed by the photographing portion (not shown) may be input to the controller 180.

The controller 180 is configured to be able to sense a gesture of the user by each of an image photographed the photographing portion (not shown) or a signal sensed from the sensing portion (not shown), or in combination with the same.

The power supply 170 is configured to supply power to components of the digital device 100. In particular, power may be supplied to the controller 180 configured as a form of a System on Chip (SoC), the display 150 for an image display, and the audio output 160 for audio output.

For the above, the power supply 170 may include a converter (not shown) configured to convert an alternating current power source to a direct current power source. Meanwhile, if the display 150 is configured as a liquid crystal panel including a plurality of backlight lamps, a Pulse Width Modulation (PWM) operable inverter (not shown) may be further included for a brightness variable or a dimming drive.

The digital device 100 may be a digital broadcast receiver in which processing of fixed-type or movable-type, ATSC or DVB, digital broadcast signals is possible.

Besides, some components among components shown may be omitted in the digital device 100 as required or on the contrary, components not shown may be further included. Meanwhile, the digital device 100 does not include the tuner and the demodulator differently from the forgoing and may receive and play contents through the network interface portion or the external device interface portion.

Meanwhile, a display device such as a smart TV as the digital device 100 may be an intelligent device to which a computer support function is added in addition to a broadcast receiving function. Therefore, the display device such as the smart TV may include a plurality of software programs (e.g., applications) similarly with a smart phone and may perform various operations conducted in each of the plurality of software programs.

Hereinafter, with reference to the described content above, a display device and a method controlling the same according to one example of the present disclosure is described.

FIG. 2 is a view showing a schematical configuration of a network system according to an example of the present disclosure.

A network system 200 according to FIG. 2 may be a small scale network system existing in a household and the like, and may include a display device 210, a remote controller 220, and an electric and electronic appliance 230.

The display device 210 may be, for example, a TV, provide a moving image service for a user, and provide various services for the user via a plurality of software programs. Meanwhile, in order to execute the plurality of software programs, the display device 210 is communicatably connected to a plurality of external servers via an internet and the like.

FIG. 3 is a view showing a schematical configuration of the display device 210 according to an example of the present disclosure.

Referring to FIG. 3, the display device 210 may include a first communicator 211, a display 212, a memory 213, and a first processor 215.

Hereinafter, a function of each component is specifically described.

The first communicator 211 may be communicatably connected to a plurality of external servers and a remote controller 220.

In particular, the first communicator 211 is communicatably connected with a remote controller 222 by using a wireless signal of a frequency bandwidth of a short-range wireless communication. As an example, the short-range wireless communication may include at least one of technologies such as Bluetooth, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB). As an example, the first communicator 211 is communicatably connected to a remote controller 222 via a wireless signal of a bluetooth frequency bandwidth (2.4 GHZ).

As an example, the first communicator 211 is configured to be able to receive a request signal periodically transmitted from the remote controller 220 and transmit a response signal corresponding to the request signal.

Meanwhile, for convenience of the description, the frequency bandwidth used by the first communicator 211 is referred to as "first frequency bandwidth.

The display 212 may consist of Liquid Crystal Display (LCD), Light Emitting Diode (LED), Organic Light Emitting Diodes (OLED), and the like, and may perform a function of displaying a video or a moving image to a user.

The memory 213 may be a volatile memory and/or nonvolatile memory and is configured to store instructions or data related to at least one different component of the display device 210. Also, the memory 213 may store data related to a plurality of software programs, and in particular, the remote controller 220 may store a software program used for controlling the display device 210.

A first processor 214 may include one or more of a central processing unit, an application processor, or a communication processor. The first processor 214 may perform an arithmetic operation or data processing related to control and/or communication of the at least one different component of the display device 210 and may execute the instructions.

Meanwhile, an identifier and a first controller are configured as a module in the first processor 214.

The identifier is configured to periodically identify whether the request packet periodically transmitted by the remote controller 220 is received or not.

The controller may control at least one different component of the display device 210. In particular, the controller may perform a certain operation based on the request packet.

Again, referring to FIG. 2, the remote controller 220 is a device remotely controlling the display device 210. As noted above, the remote controller 220 is configured to control the display device 210 by using a short-range wireless communication method (e.g., a Bluetooth communication method).

FIG. 4 is a view showing a schematical configuration of the remote controller 220 according to an example of the present disclosure.

Referring to FIG. 4, the remote controller 220 may include a plurality of buttons 221, a second communicator 222, a buffer 223, and a second processor 224.

Hereinafter, a function of each component is specifically described.

A plurality of buttons 221 may be a physical button or a logical button. The user may perform a motion of pressing the button 221 with hands (i.e., a press event) or taking the hands off (i.e., a release event) and may control the display device 210 based on the motion performed.

The plurality of buttons 221 may include two or more repeat buttons. The repeat button may be a button which is capable of performing the repeat event. The repeat event corresponds to the event in that the user continuously presses a certain button. As an example, two or more repeat buttons may include a channel button 2211, a volume button 2212, and four arrow key buttons 2213.

The second communicator 222 is communicatably connected to the first communicator 211 of the display device 210. That is, the second communicator 222 is configured to periodically transmit the request signal and receive a response signal from the display device 210. Here, as noted above, the second communicator 222 is configured to be communicatably connected to the first communicator 211 by using the first frequency bandwidth.

The buffer 223 includes a plurality of buffer cells and stores a press event or a release event of each of the plurality of buttons 221.

As an example, the number of a plurality of buffer cells may be 10 but the present disclosure is not limited thereby.

A second processor 224 may include one or more of a central processing unit, an application processor, or a communication processor. The second processor 224 may perform an arithmetic operation or data processing related to control and/or communication of the at least one different component of the remote controller 220.

Meanwhile, in order to control at least one different component of the remote controller 220, a second controller may be configured as a module in the second processor 224.

Again, referring to FIG. 2, the electric and electronic appliance 230 is a device disposed adjacent to the display device 210 and the remote controller 220 and uses a first frequency bandwidth. As an example, the electric and electronic appliance 230 may be a router.

Meanwhile, an error in an operation of the display device 210 controlled by the remote controller 220 may occur due to use of the first frequency bandwidth of the electric and electronic appliance 230. As an example, a state where even though a user presses a certain button of the remote controller 220 once, the certain button is successively pressed in the display device 210 may occur.

Hereinafter, referring to drawings below, operations of the display device 210 and the remote controller 220 for preventing the above state are more specifically described.

1) Normal Operation of the Display Device 210

FIG. 5 is a view showing a flow chart of a state where the display device 210 normally operates.

The remote controller 220 is configured to transmit a first request packet containing a press event of a first button of a plurality of buttons 221, to the display device 210 (S510).

Here, the first button may be a button such as a channel button 2211, a volume button 2212, and four arrow key buttons 2213 in which a repeat event is possible. However, the present disclosure is not limited thereby and the first button may be a button in which the repeat event is not possible.

The display device 210 is configured to receive the first request packet (S520) and transmit a first response packet which is a response to the first request packet, to the remote controller 220 (S530).

The remote controller 220 is configured to receive the first response packet (S540) and transmit a second request packet containing the release event of the first button to the display device 210 (S550).

The display device 210 is configured to receive the second request packet (S560) and transmit a second response packet which is a response to the second request packet, to the remote controller 220 (S570). The remote controller 220 is configured to receive the second response packet (S580).

Through the above process, the display device 210 processes the press event and the release event of the first button and processes an operation according to the first button.

2) Abnormal Operation 1 of the Display Device 210

Referring to FIG. 6, in a state where the remote controller 220 transmits the first request packet containing the press event of the first button to the display device 210 (S610), the display device 210 receives the first request packet (S620), and the display device 210 transmits the first response packet to the remote controller 220 (S630), a state where the remote controller 220 fails to receive the first response packet may occur (S640).

If the remote controller 220 fails to receive the first response packet, the unprocessed press events of the first button are accumulated in the buffer 223 of the remote controller 220. If the above state continues, the press events of the first button are stored in all of the plurality of buffer cells of the buffer 233. In the display device 210, the repeat event in which the first button is continuously pressed may occur.

Therefore, in order to prevent unintentional occurrence of the repeat event of the first button, the remote controller 220 if the press events of the first button are stored in all of the plurality of buffer cells of the buffer 223, may delete all of the press events of the first button stored in the buffer 223.

This operation may be performed in the second controller. Further, the operation of deleting the press events of the first button stored in the plurality of buffer cells of the buffer 223 is shown in FIG. 7.

If all of the press events of the first button are deleted in the plurality of buffer cells of the buffer 233, the repeat event of the first button may be stopped.

3) Abnormal Operation 2 of the Display Device 210

Referring to FIG. 8, in a state where the remote controller 220 transmits the first request packet containing the press event of the first button, to the display device 210 (S810), the display device 210 receives the first request packet (S820), the display device 210 transmits the first response packet to the remote controller 220 (S830), and the remote controller 220 receives the first response packet (S840), a state where the remote controller 220 fails to transmit the second request packet containing the release event of the first button may occur (S850).

That is, if the press event of the first button is stored in all of the plurality of buffer cells of the buffer 223, the second controller 2214 may not store the release event of the first button in the buffer 223. Accordingly, a state where the remote controller 220 may not transmit the second request packet may occur. In this case, in the display device 210, the repeat event such that the second request packet may not be received, and thus the first button is continuously pressed may occur.

Therefore, in order to prevent unintentional occurrence of the repeat event of the first button, a second controller 2241 of the remote controller 220 may delete all of the press events of the first button stored in the buffer 223, and the repeat event of the first button may be stopped as previously described.

4) Abnormal Operation 3 of the Display Device 210 and the Remote Controller 220

Referring to FIG. 9, in a state where the remote controller 220 transmits the first request packet containing the press event of the first button to the display device 210 (S910), the display device 210 receives the first request packet (S920), the display device 210 transmits the first response packet to the remote controller 220 (S930), the remote controller 220 receives the first response packet (S940), and the remote controller 220 transmits the second request packet containing the release event of the first button (S950), a state where the display device 210 fails to receive the second request packet may occur (S960). In this case, in the display device 210, the repeat event such that the first button is continuously pressed may occur.

Therefore, in order to prevent unintentional occurrence of the repeat event of the first button, the display device 210 if the second request packet is not received within the predetermined time period, may forcibly perform the release event of the first button.

Here, the predetermined time period has a start point which is a time point when the display device 210 transmits the first response packet, wherein a size of the time period may be set based on a period when the remote controller 220 transmits the first and second request packets. As an example, if the remote controller 220 transmits the first and second request packets in a period of 10 ms, the size of the time period may be set as 1 second which is 100 times 10 ms.

That is, if the second request packet is not received in the time period, the display device 210 forcibly performs the release event of the first button. Accordingly, the repeat event of the first button may be stopped.

Meanwhile, the first button may be a voice button configured to input a voice of a user. In this case, an operation similar with the operation described above may be performed.

That is, in a state where the first request packet containing the press event of the voice button is received from the remote controller, if not all of voices of the user corresponding to the voice button are received during the predetermined time period, the display device 210 may perform the release event of the voice button.

That is, if an event that "turn volume up" is performed via voices, the display device 210 should receive all voices corresponding to "turn volume up". However, due to use of the first frequency bandwidth of the electric and electronic appliance 230, if not all of voices corresponding to "turn volume up" are received during the predetermined time period, the release event of the voice button may be performed.

Meanwhile, apart from the content described above, an operation of the display device 210 for preventing unintentional occurrence of the repeat event of the first button is specifically described.

According to an example of the present disclosure, the display device 210 may periodically identify whether the request packet is received within a certain time period, and if periodical reception of the request packet within the certain time period is stopped, may forcibly perform the release event of the first button.

More specifically, the remote controller 220 may periodically transmit the request signal related to the first button and the display device 210 may identify whether the repeat event occurs according to the request signal received in the first time period. For the above, the display device 210 may periodically identify whether the request packet is received within the first time period or not.

Here, the first button may be a button by which a repeat operation is possible. Further, the request packet may include any one of the press event of the first button and the release event of the first button. Also, the first time period may be a time period for identifying whether a repeat event of the first button occurs or not. Further, a start point of the first time period may correspond to a time point when the request packet is first received. Also, a period at which the request packet is transmitted may be identical to a period for identifying whether the request packet is received within the first time period.

As an example, referring to FIG. 10, the request signal may be transmitted at a period of 10 ms, the display device 210 may identify whether the request signal is received at a period of 10 ms, and a size of the first time period may be 400 ms.

Referring to the content described above, the display device 210 may periodically identify whether the request packet is received within the first time period or not, and if periodical reception of the request packet is stopped within the first time period, may forcibly perform the release event of the first button.

That is, if the request packet is not received at a certain time point in the first time period, the display device 210 may forcibly perform the release event of the first button. Here, the request packet may be any one of the press event of the first button and the release event of the first button. That is, regardless of a type of the event, if the request signal itself is not received, it is determined that a channel loss occurs. Accordingly, the display device 210 may forcibly perform the release event of the first button.

In addition, the display device 210 if the repeat event of the first button occurs, may periodically identify whether the request packet is received within the second time period or not, and if periodical reception of the request packet is stopped within the second time period, may forcibly perform the release event of the first button.

Here, the request packet may include any one of the press event of the first button and the release event of the first button. Also, the second time period may be a time period for processing the repeat event of the first button. Further, the second time period is a time period right after the first time period. Further, it is possible to periodically process the repeat event within the second time period. Also, a period at which the request packet is transmitted may be identical to a period for identifying whether the request packet is received within the second time period.

As an example, referring to FIG. 10, the request signal may be transmitted at a period of 10 ms, the display device 210 may identify whether the request signal is received at a period of 10 ms, the second time period exists right after the first time period, and the repeat event may be processed at 45 ms.

Referring to the content described above, the display device 210 may periodically identify whether the request packet is received within the second time period, and if periodical reception of the request packet is stopped within the second time period, may forcibly perform the release event of the first button. This is similar with the operation of the display device 210 of the first time period.

Through the content described above, the display device 210 may fundamentally prevent the repeat event of the first button which is not intended. Further, a malfunction of the remote controller is prevented, and thus the user's inconvenience in use of the remote controller may be resolved.

Meanwhile, according to another example of the present disclosure, in order to prevent the repeat event of the first button which is not intended, the display device 210 may display a guidance message which induces movement of a position of the electric and electronic appliance 230 using the first frequency bandwidth, to the user.

More specifically, as a distance between the display device 210 and the electric and electronic appliance 230 is far, an error in an operation of the remote controller due to use of the first frequency bandwidth may be reduced. Therefore, if environmental deterioration of the first frequency bandwidth is sensed, a first processor 214 may control the display 212 to display the guidance message which induces movement of the position of the electric and electronic appliance 230. This is shown in FIG. 11. Meanwhile, if the guidance message is continuously displayed, inconvenience of the user may occur. Therefore, the display device 210 may display the guidance message only once.

Also, even though it is described that all components configuring examples of the present disclosure are combined as one or are combined to operate, the present disclosure is not necessarily limited by these examples. All components may be selectively combined as one or more and operate within a targeted range of the present disclosure. Also, each of all components may be configured as one independent hardware, but may be configured as a computer program having a program module performing part or all of functions combined in one hardware or a plurality of hardware by selectively combining part or all of each component. Codes and segments configuring the computer program may be easily inferred by those skilled in the art. This computer program may be stored in Computer Readable Media which may be read by a computer, and may be read and executed by the computer, so that the examples of the present disclosure may be realized. A storing medium of the computer program may include magnetic recording media, optical recording media, and semiconductor recording elements. Also, the computer program configuring the examples of the present disclosure may include a program module transmitted in real time via an external device.

As the above, though the present disclosure is described with reference to exemplary drawings, it is obvious that the present disclosure is not limited by the examples and drawings disclosed in this specification, and various modifications may be made by those skilled in the art within a range of the technical spirit of the present disclosure. In addition, it is natural that in describing the examples of the present disclosure above, though action and effects according to configurations of the present disclosure are not definitely described and explained, predictable effects thanks to the relevant configurations are also to be admitted.

The invention claimed is:

1. A display device, comprising:
   a communicator configured to receive a request packet periodically transmitted from a remote controller with a plurality of buttons, wherein the request packet includes an event associated with a first button among the plurality of buttons;
   an identifier configured to periodically identify whether the request packet is received within a first time period; and
   a controller configured to, when periodic reception of the request packet is stopped within the first time period, control an operation of the display device to forcibly perform a release event of the first button,
   wherein the first time period is a time period for identifying whether a repeat event of the first button occurs,
   wherein a start point of the first time period corresponds to a time point when the request packet is first received,
   wherein the identifier is configured to periodically identify whether the request packet is received within a second time period when the repeat event of the first button occurs, and
   wherein the controller is configured to, when a periodic reception of the request packet is stopped within the second time period, control the operation of the display device to forcibly perform the release event of the first button.

2. The display device of claim 1, wherein the communicator and the remote controller are connected in a communicable way using a first frequency bandwidth, and
   wherein electric and electronic appliances using the first frequency bandwidth are disposed adjacent to the display device and the remote controller.

3. The display device of claim 1, wherein the request packet comprises any one of a press event of the first button and the release event of the first button.

4. The display device of claim 1, wherein a period at which the request packet is transmitted is identical to a period for identifying whether the request packet is received within the first time period.

5. The display device of claim 1, wherein the first button is a button by which a repeat operation is possible.

6. The display device of claim 1, wherein the second time section is a time period for processing the repeat event of the first button, and
   wherein the second time period is a time period right after the first time period.

7. The display device of claim 1, wherein a period at which the request packet is transmitted is identical to a period for identifying whether the request packet is received within the second time period.

* * * * *